(12) United States Patent
Seo et al.

(10) Patent No.: US 10,075,927 B2
(45) Date of Patent: Sep. 11, 2018

(54) METHOD FOR TRANSMITTING AND RECEIVING CONTROL INFORMATION AND APPARATUS FOR SAME

(71) Applicant: LG ELECTRONICS INC., Seoul (KR)

(72) Inventors: Daewon Seo, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 14/383,046

(22) PCT Filed: Mar. 5, 2013

(86) PCT No.: PCT/KR2013/001748
§ 371 (c)(1),
(2) Date: Sep. 4, 2014

(87) PCT Pub. No.: WO2013/137580
PCT Pub. Date: Sep. 19, 2013

(65) Prior Publication Data
US 2015/0078270 A1   Mar. 19, 2015

Related U.S. Application Data

(60) Provisional application No. 61/609,919, filed on Mar. 12, 2012.

(51) Int. Cl.
*H04W 52/44* (2009.01)
*H04W 52/36* (2009.01)
(Continued)

(52) U.S. Cl.
CPC ......... *H04W 52/44* (2013.01); *H04W 52/146* (2013.01); *H04W 52/248* (2013.01);
(Continued)

(58) Field of Classification Search
CPC . H04W 52/248; H04W 52/44; H04W 52/383; H04W 52/146; H04W 52/36;
(Continued)

(56) References Cited

U.S. PATENT DOCUMENTS

2009/0103507 A1* 4/2009 Gu ................. H04L 27/2608
370/342
2009/0325625 A1* 12/2009 Hugl .................. H04W 52/16
455/522

(Continued)

FOREIGN PATENT DOCUMENTS

KR   10-2009-0005647 A   1/2009
KR   10-2010-0086632 A   8/2010

*Primary Examiner* — Hassan Kizou
*Assistant Examiner* — Abdullah Ahmed
(74) *Attorney, Agent, or Firm* — Birch, Stewart, Kolasch & Birch, LLP

(57) ABSTRACT

Specifically, in one aspect of the present invention, a method and apparatus for controlling transmitting power by a terminal in a wireless communication system that supports device to device (D2D) communication include: receiving a power control command through a control channel from a base station; and adjusting transmitting power according to the power control command, wherein when the terminal performs D2D communication, the power control command indicates one of a first set of power control values having more states assigned to lower the transmitting power, and when the terminal performs communication with the base station, the power control command indicates one of a second set of power control values having more states assigned to raise the transmitting power.

16 Claims, 12 Drawing Sheets

(51) Int. Cl.
*H04W 52/46* (2009.01)
*H04W 52/14* (2009.01)
*H04W 52/38* (2009.01)
H04W 52/24 (2009.01)
H04W 52/26 (2009.01)

(52) U.S. Cl.
CPC ......... *H04W 52/36* (2013.01); *H04W 52/383* (2013.01); *H04W 52/46* (2013.01); *H04W 52/241* (2013.01); *H04W 52/262* (2013.01)

(58) Field of Classification Search
CPC .. H04W 52/46; H04W 52/262; H04W 52/241
See application file for complete search history.

(56) References Cited

U.S. PATENT DOCUMENTS

| | | | |
|---|---|---|---|
| 2011/0105061 A1* | 5/2011 | Yu | H03G 3/3042 455/127.2 |
| 2011/0275382 A1* | 11/2011 | Hakola | H04W 24/10 455/452.2 |
| 2012/0294204 A1* | 11/2012 | Chen et al. | H04L 5/0053 370/280 |
| 2013/0040675 A1* | 2/2013 | Ant | H04W 52/226 455/509 |
| 2013/0077513 A1* | 3/2013 | Ng | H04B 7/024 370/252 |
| 2014/0105117 A1 | 4/2014 | Kwon et al. | |
| 2014/0153390 A1* | 6/2014 | Ishii | H04W 76/023 370/230 |

\* cited by examiner

FIG. 6
(a)
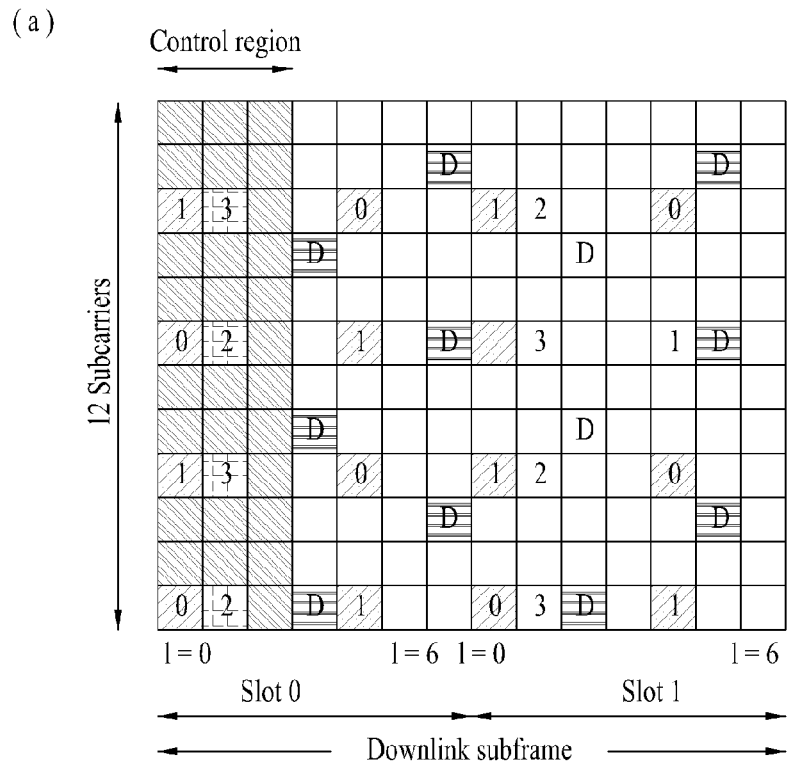
(b)
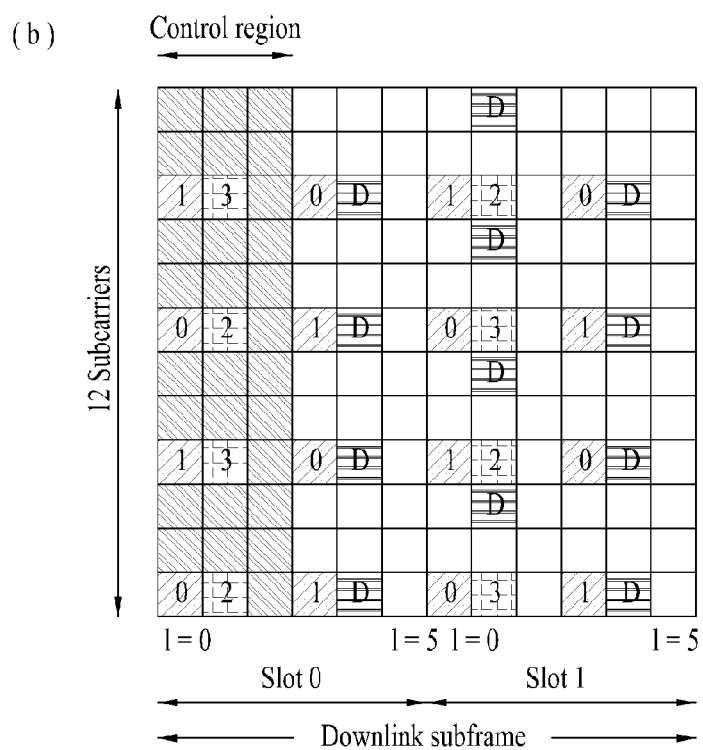

METHOD FOR TRANSMITTING AND RECEIVING CONTROL INFORMATION AND APPARATUS FOR SAME

This application is the National Phase of PCT/KR2013/001748 filed on Mar. 5, 2013, which claims priority under 35 U.S.C. 119(e) to U.S. Provisional Application No. 61/609,919 filed on Mar. 12, 2012, all of which are hereby expressly incorporated by reference into the present application.

FIELD OF THE INVENTION

The present invention relates to a wireless communication system and, more particularly, a method for transmitting and receiving control information and an apparatus for the same in a D2D (Device-to-Device) system.

BACKGROUND ART

D2D (Device to Device) communication refers to a communication between an electronic device and another electronic device. As a broader definition, D2D communication refers to a wireless or wired communication between electronic devices, or to a communication between a user-controlled device and a machine. However, recently, D2D communication has generally been defined as a wireless communication between an electronic device and another electronic device, which is performed without any human intervention.

When the concept of D2D communication was first adopted in the early 1990's, D2D communication was merely understood and recognized as the concept of remotely controlled communication or telematics, and the related market was also limited to such concept. However, over the past few years, D2D communication has been under development at a remarkable rate and has now evolved to a market drawing national and worldwide attention. Most particularly, the D2D communication has greatly influenced diverse fields including Fleet Management, remote monitoring of devices and equipments, smart meter for measuring the operation time of a construction equipment installation and for automatically measuring the usage amount of heat or electricity in an applied market related to the Point of Sales (POS) and security. The D2D communication that is to be used in the future is expected to be used and applied for a wider scope of usage in association with the conventional mobile communication and high speed wireless internet or low power communication solutions, such as Wi-Fi and Zigbee, thereby becoming the basis for expanding its market domain to the B2C market, and not being limited only to the B2B market.

In the age of D2D communication, all types of machines (or devices) equipped with a SIM (Subscriber Identity Module) card may perform data reception and transmission, thereby being capable of being remotely controlled and managed. For example, being applied to an extended range of devices and equipments, such as cars, trucks, trains, containers, vending machines, gas tanks, and so on, the D2D communication technology may be applied to an enormous range of application. However, research of the D2D communication method including a base station and D2D user equipments is still is a state of requiring further development.

DETAILED DESCRIPTION OF THE INVENTION

Technical Objects

An object of the present invention is to provide a method for efficiently transmitting and receiving a signal in a wireless communication system supporting D2D communication and an apparatus for the same.

Another object of the present invention is to provide a method for efficiently controlling transmission power in a wireless communication system supporting D2D communication and an apparatus for the same.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In an aspect of the present invention, provided herein is a method for a user equipment to control a transmission power in a wireless communication system supporting a D2D (Device-to-Device) communication, and the method includes receiving a power control command from the base station through a control channel; and adjusting a transmission power in accordance with the power control command, wherein, when the user equipment performs a D2D communication, the power control command may indicate one value from a first set of power control values having a larger number of status allocated for reducing the transmission power, and wherein, when the user equipment performs a communication with the base station, the power control command may indicate one value from a second set of power control values having a larger number of status allocated for increasing the transmission power.

Preferably, the first set of power control values may include {−3 dB, −1 dB, 0 dB, 1 dB}, and the second set of power control values may include {−1 dB, 0 dB, 1 dB, 3 dB}.

Preferably, the adjusting of the transmission power may include adding a value indicated by the power control command from the first set of power control values or the second set of power control values to a preamble power.

In another aspect of the present invention, a user equipment configured to control a transmission power in a wireless communication system supporting a D2D (Device-to-Device) communication, the user equipment including a RF (Radio Frequency) module; and a processor, wherein the processor is configured to receive a power control command from the base station through a control channel, and to adjust a transmission power in accordance with the power control command, and wherein, when the user equipment performs a D2D communication, the power control command may indicate one value from a first set of power control values having a larger number of status allocated for reducing the transmission power, and wherein, when the user equipment performs a communication with the base station, the power control command may indicate one value from a second set of power control values having a larger number of status allocated for increasing the transmission power.

Preferably, the first set of power control values may include {−3 dB, −1 dB, 0 dB, 1 dB}, and the second set of power control values may include {−1 dB, 0 dB, 1 dB, 3 dB}.

Preferably, the adjusting of the transmission power includes adding a value indicated by the power control command from the first set of power control values or the second set of power control values to a preamble power.

In yet another aspect of the present invention, provided herein is a method for a base station to transmit control information in a wireless communication system supporting a D2D (Device-to-Device) communication, the method including receiving channel status information from a first user equipment; and transmitting a power control command to a second user equipment through a control channel, the power control command being decided based upon the channel status information, and wherein, when the first user equipment and the second user equipment are different from each other, the power control command may indicate one value from a first set of power control values having a larger number of status allocated for reducing the transmission power, and wherein, the first user equipment and the second user equipment are the same, the power control command may indicate one value from a second set of power control values having a larger number of status allocated for increasing the transmission power.

Preferably, the first set of power control values may include {−3 dB, −1 dB, 0 dB, 1 dB}, and the second set of power control values may include {−1 dB, 0 dB, 1 dB, 3 dB}.

Preferably, the channel status information may include at least one of reception power information of a reference signal, SINR (Signal to Interference plus Noise Ratio) information, and MCS (modulation and coding scheme) level information.

More preferably, the SINR information may include at least one of difference information between a received SINR level and a target SINR of the first user equipment, a margin value for a minimum SINR level at which an MCS level is normally operated, the MCS level being currently used by the first user equipment, and a margin value for a minimum SINR level allowing a higher MCS level to be operated, the higher MCS level being higher than the MCS level currently used by the first user equipment.

More preferably, the MCS level information may include target MCS level information, the target MCS level information being decided by a received SINR level of the first user equipment.

In a further aspect of the present invention, provided herein is a base station configured to transmit control information to a user equipment in a wireless communication system supporting a D2D (Device-to-Device) communication, the base station including a RF (Radio Frequency) module; and a processor, wherein the processor is configured to receive channel status information from a first user equipment; and to transmit a power control command to a second user equipment through a control channel, the power control command being decided based upon the channel status information, and wherein, when the first user equipment and the second user equipment are different from each other, the power control command may indicate one value from a first set of power control values having a larger number of status allocated for reducing the transmission power, and wherein, the first user equipment and the second user equipment are the same, the power control command may indicate one value from a second set of power control values having a larger number of status allocated for increasing the transmission power.

Preferably, the first set of power control values may include {−3 dB, −1 dB, 0 dB, 1 dB}, and the second set of power control values may include {−1 dB, 0 dB, 1 dB, 3 dB}.

Preferably, the channel status information may include at least one of reception power information of a reference signal, SINR (Signal to Interference plus Noise Ratio) information, and MCS (modulation and coding scheme) level information.

More preferably, the SINR information may include at least one of difference information between a received SINR level and a target SINR of the first user equipment, a margin value for a minimum SINR level at which an MCS level is normally operated, the MCS level being currently used by the first user equipment, and a margin value for a minimum SINR level allowing a higher MCS level to be operated, the higher MCS level being higher than the MCS level currently used by the first user equipment.

More preferably, the MCS level information may include target MCS level information, the target MCS level information being decided by a received SINR level of the first user equipment.

According to the present invention, a signal may be efficiently transmitted and received in a wireless communication system supporting D2D communication. Additionally, transmission power may be efficiently controlled in a wireless communication system supporting D2D communication.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings are provided to facilitate the understanding of the present invention, and a more detailed understanding of the present invention will be provided based upon examples given with reference to the accompanying drawings. However, the technical characteristics of the present invention will not be limited only to a specific drawing, and it should be understood that the characteristics disclosed in the accompanying drawings may be combined so as to configure a new exemplary embodiment of the present invention.

FIG. 6 illustrates an exemplary pattern of a reference signal being mapped to a downlink resource block (RB) pair, which is defined in an LTE system.

MODE FOR CARRYING OUT THE PRESENT INVENTION

Figure 1:
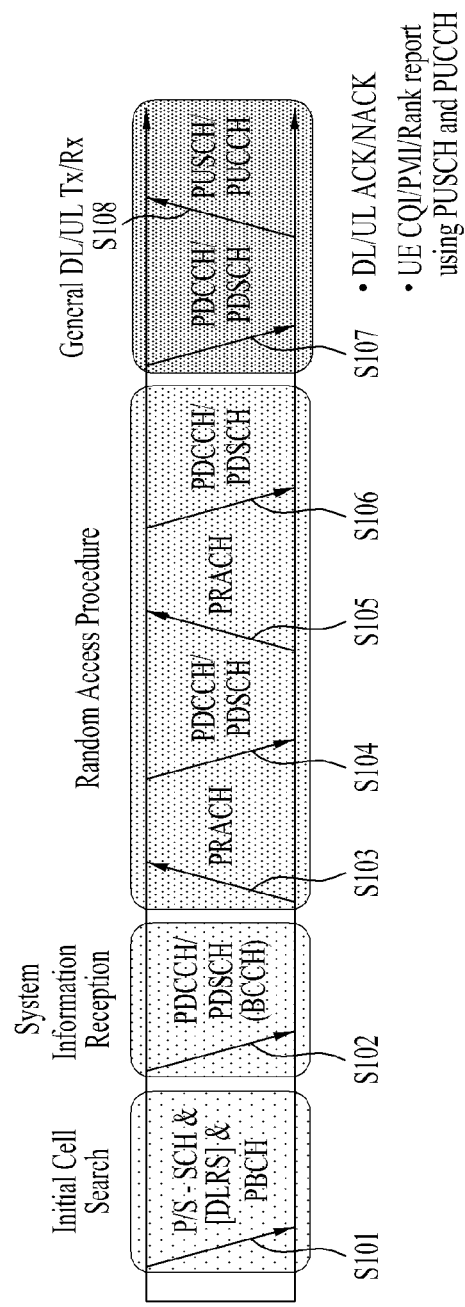
FIG. 1 illustrates physical channels being used in a 3GPP LTE system and a general signal transmitting method using the physical channels.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In order to avoid any ambiguity in the concept (or idea) of the present invention, some of the structures and devices disclosed (or mentioned) in the present invention may be omitted from the description of the accompanying drawings of the present invention. Also, any procedure or step that can be easily understood by anyone skilled in the art has also been excluded from the description of the present invention.

In the description of the present invention, the embodiments of the present invention will be described by mainly focusing on the data transmission and reception relation in a wireless communication system including a base station. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal may be performed by the base station or network nodes other than the base station. Herein, the term 'Base Station (BS)' may be replaced by other terms, such as fixed station, Node B, eNode B (eNB), ABS (Advanced Base Station), or Access Point (AP).

Moreover, in the present invention, the user equipment refers to a user equipment that is designated as a control information transmission/reception target in the wireless communication system according to the present invention. And, therefore, the user equipment may also be simply referred to as a Device. Additionally, the term user equipment (or user terminal) may be replaced by terms including MS (Mobile Station), UE (User Equipment), SS (Subscriber Station), MSS (Mobile Subscriber Station), Mobile Terminal, AMS (Advanced Mobile Station), Terminal, or Device.

The exemplary embodiments of the present invention may be supported by the standard documents that are disclosed in at least any one of the diverse wireless access systems, such as an IEEE 802 system, a 3GPP system, a 3GPP LTE (Long-Term Evolution) system, an LTE-A (LTE-Advanced) system, and a 3GPP2 system. More specifically, among the exemplary embodiments of the present invention, reference may be made to the above-mentioned documents for the description of obvious process steps or elements of the present invention that have not been described herein in order to clearly show the technical spirit of the present invention.

The technology described below may be used in a wide range of wireless access systems, such as CDMA (code division multiple access), FDMA (frequency division multiple access), TDMA (time division multiple access), OFDMA (orthogonal frequency division multiple access), SC-FDMA (single carrier frequency division multiple access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

The detailed description that is to be disclosed along with the appended drawings merely corresponds to the description of the exemplary embodiments of the present invention, and, therefore, it is not intended to represent a sole exemplary embodiments that may be realized by the present invention.

Reference will now be made in detail to the preferred embodiments of the present invention, examples of which are illustrated in the accompanying drawings, so that anyone skilled in the art can easily implement the embodiments of the present invention. However, it will be apparent that the present invention may be implemented in a variety of different structures, and, therefore, the present invention will not be limited only to the exemplary embodiments presented herein. Furthermore, in the accompanying drawings, in order to clearly describe the embodiments of the present invention, any parts irrelevant to the description of the present invention will be omitted. And, wherever possible, similar reference numbers will be used throughout the drawings to refer to the same or like parts.

Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", " . . . module", and so on, which are indicated in the description of the present invention, indicates units that process at least one function or operation. And, this may be realized in the form of hardware or software, or a combination of hardware and software.

Additionally, the specific terms used in the following embodiments of the present invention are provided to facilitate the understanding of the present invention. And, therefore, without deviating from the technical scope and spirit of the present invention, such specific terms may also be varied and/or replaced by other terms.

Hereinafter, preferred exemplary embodiments according to the present invention will be described in detail with reference to the accompanying drawings.

FIG. 1 illustrates physical channels being used in a 3GPP LTE system and a general signal transmitting method using the physical channels.

When a power of a user equipment is turned off and then turned back on, or when a user equipment newly enters (or accesses) a cell, the user equipment performs an initial cell search process, such as synchronizing itself with the base station in step S101. For this, the user equipment may receive a Primary Synchronization Channel (P-SCH) and a Secondary Synchronization Channel (S-SCH) from the base station so as to be in synchronization with the base station, and the user equipment may also acquire information, such as cell ID (cell identity). Thereafter, the user equipment may receive a Physical Broadcast Channel (PBCH) so as to acquire broadcast information within the cell. Meanwhile, the user equipment may receive a Downlink Reference Signal (DL RS), in the step of initial cell search, so as to verify the downlink channel status.

The user equipment that has completed the initial cell search may receive a Physical Downlink Control Channel (PDCCH) and a Physical Downlink Shared Channel (PDSCH) based upon the PDCCH information, in step S102, so as to acquire more detailed system information.

Thereafter, in order to complete the access to the base station, the user equipment may perform a Random Access Procedure, such as in steps S103 and S106 of a later process, so as to complete the access to the base station. In order to do so, the user equipment transmits a preamble through a Physical Random Access Channel (PRACH) (S103), and then the user equipment may receive a response message respective to the random access through the PDCCH and its respective PDSCH (S104). In case of a contention based random access, the user equipment may perform Contention Resolution Procedures, such as transmitting an additional Physical Random Access Channel (PRACH) (S105) and receiving a Physical Downlink Control Channel (PDCCH) and a Physical Downlink Shared Channel (PDSCH) corresponding to the PDCCH (S106).

After performing the above-described procedures, the user equipment may receive a Physical Downlink Control Channel (PDCCH)/Physical Downlink Shared Channel (PDSCH) (S107), as a general uplink/downlink signal transmission procedure, and may then perform Physical Uplink Shared Channel (PUSCH)/Physical Uplink Control Channel (PUCCH) transmission (S108). The control information being transmitted by the user equipment to the base station is collectively referred to as Uplink Control Information (UCI). The UCI may include HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 2:
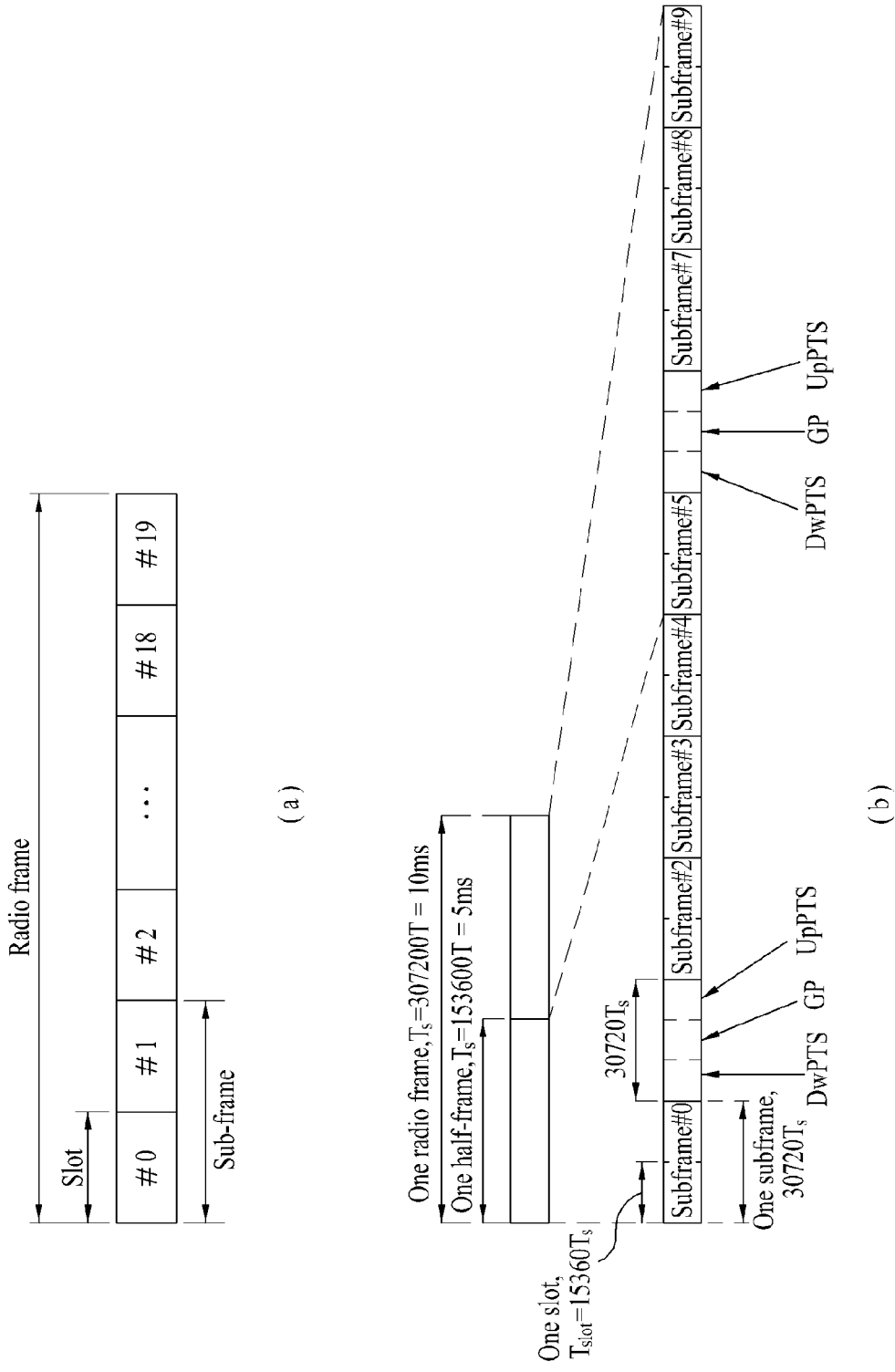
FIG. 2 illustrates an exemplary structure of a radio frame.

FIG. 2 illustrates an exemplary structure of a radio frame. In a cellular OFDM radio packet communication system, uplink/downlink data packet transmission is performed in subframe (SF) units, and one subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

FIG. 2(a) illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM symbols in the time domain and includes a plurality of Resource Blocks (RBs) in the frequency domain. Since the 3GPP LTE system uses the OFDM in a downlink, an OFDM symbol indicates one symbol section. The OFDM symbol may also be referred to as a SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. For example, in case of the extended CP, the number of OFDM symbols included in one slot may be equal to 6. In case the user equipment is moving at a high speed, or in case the channel status is unstable, the extended CP may be used in order to further reduce the interference between the symbols.

In case of using the normal CP, since one slot includes 7 OFDM symbols, one subframe includes 14 OFDM symbols. At this point, the first maximum of 3 OFDM symbols of each subframe are allocated to a PDCCH (Physical Downlink Control Channel), and the remaining OFDM symbols may be allocated to a PDSCH (Physical Downlink Shared Channel).

FIG. 2(b) illustrates an exemplary structure of a type 2 radio frame. The type 2 radio frame consists of 2 half frames, and each half frame is configured of 5 general subframes and includes a DwPTS (Downlink Pilot Time Slot), a Guard Period (GP), and a UpPTS (Uplink Pilot Time Slot). One (1) subframe is configured of 2 slots. The DwPTS is used for performing initial cell search, synchronization or channel estimation in the user equipment. And, the UpPTS is used for matching a channel estimation performed in the based station with an uplink transmission synchronization performed in the user equipment. The guard period refers to a period for eliminating (or removing) interference that occurs in an uplink, due to a multiple path delay of a downlink signal between an uplink and a downlink. Table 1 illustrates an exemplary Uplink-Downlink Configuration of subframes included in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a downlink subframe (DL SF), U indicates an uplink subframe (UL SF), and S represents a special subframe. Herein, the special subframe includes DwPTS, GP, and UpPTS. Table 2 shown below shows an exemplary configuration of the special subframe.

Table 2

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame is merely exemplary. And, therefore, the number of subframes included in the radio frame or the number of slots included in a subframe, and the number of symbols included in one slot may be diversely varied.

Figure 3:
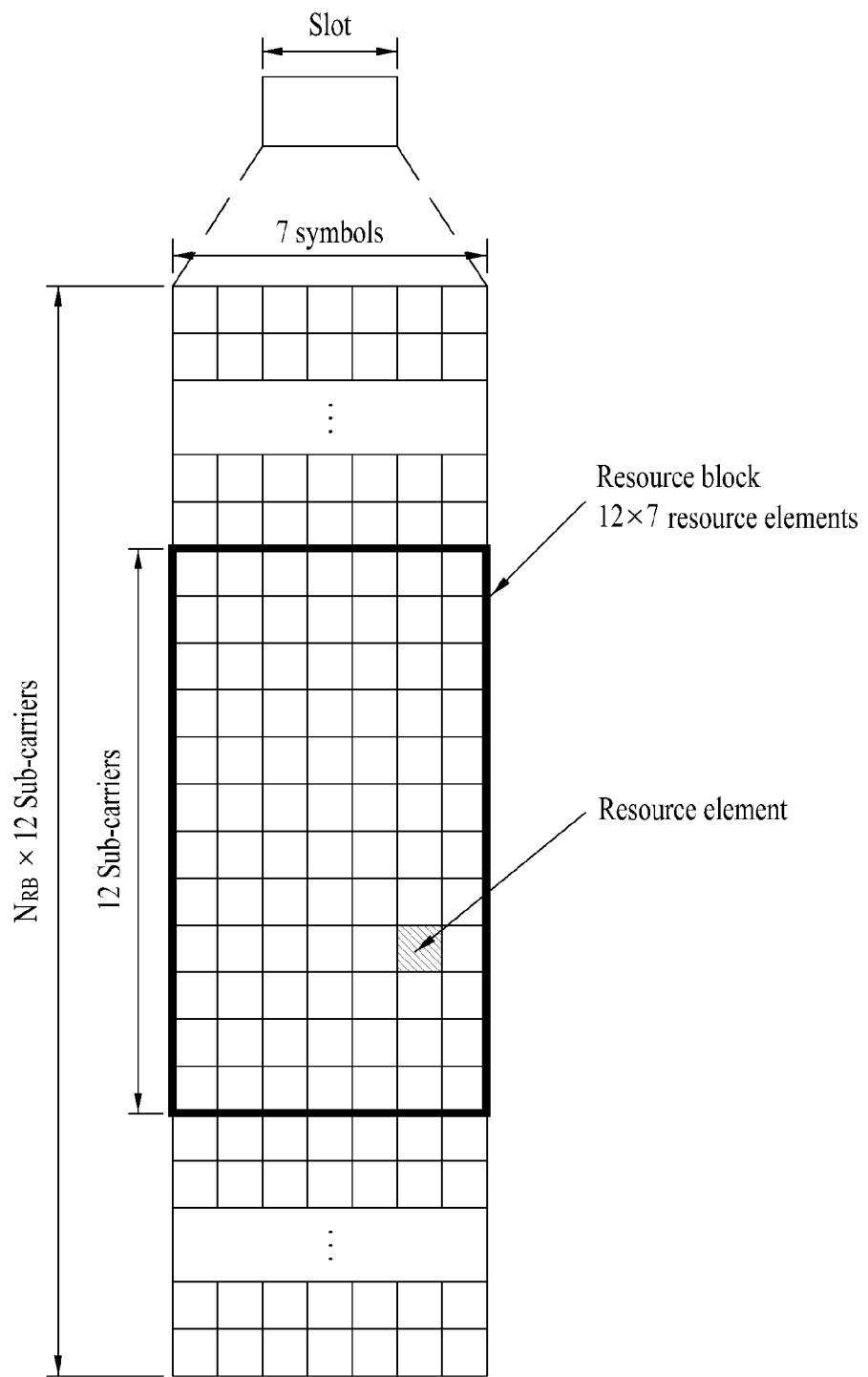
FIG. 3 illustrates an exemplary resource grid for a downlink slot.

FIG. 3 illustrates an exemplary resource grid for a downlink slot.

Referring to FIG. 3, a downlink slot includes multiple OFDM symbols in the time domain. In this example, one downlink slot may include 7 OFDM symbols in a time domain, and a resource block (RB) may include 12 subcarriers in the frequency domain. However, the present invention will not be limited only to this. Each element within the resource grid is referred to as a resource element (RE). One RB includes 12×7 REs. NDL, which corresponds to a number of RBs included in a downlink slot, is dependent to a downlink transmission bandwidth. The structure of an uplink slot may be identical to the structure of the downlink slot.

Figure 4:
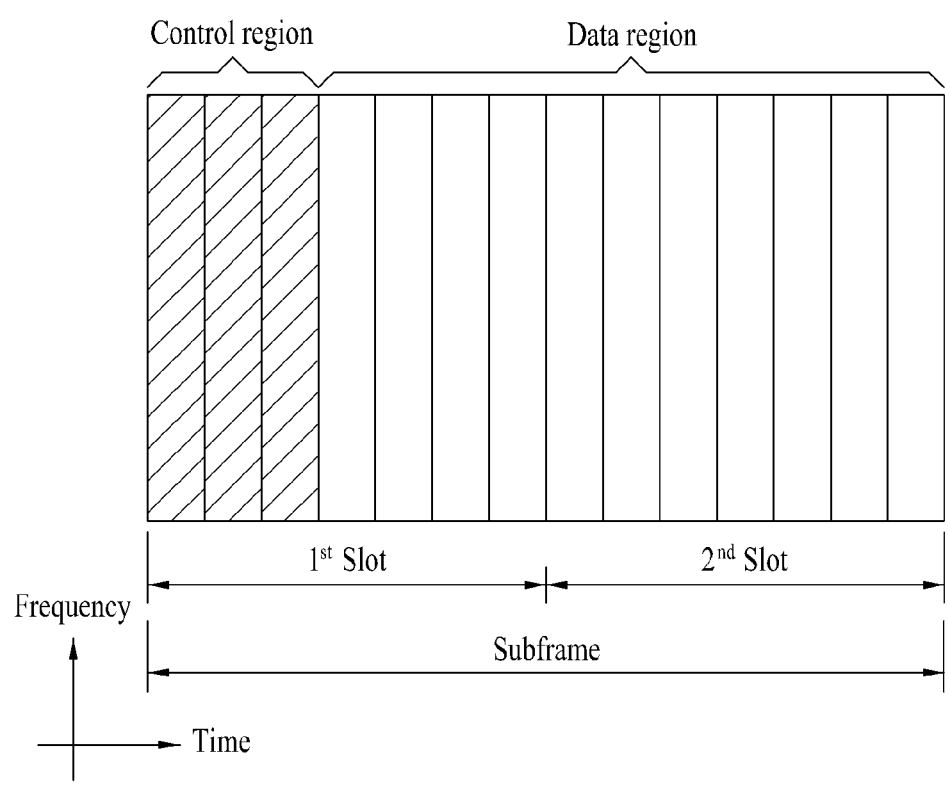
FIG. 4 illustrates an exemplary structure of a downlink subframe.

FIG. 4 illustrates an exemplary structure of a downlink subframe.

Referring to FIG. 4, a subframe includes multiple (e.g., 2) time regions, which are multiplexed by TDM (Time Division Multiplexing). A first time region may be used for transmitting control signals. A second time region may be used for transmitting data signals. For simplicity, the first time region may be referred to as a control region, and the second time region may be referred to as a data region. More specifically, a maximum of 3(4) OFDM symbols located at the front portion of a first slot within one subframe corresponds to a control region, wherein a control channel is allocated (or assigned). The remaining OFDM symbols correspond to a data region, wherein a Physical Downlink Shared Channel (PDSCH) is assigned, and a basic resource unit of the data region corresponds to an RB. Examples of the downlink control channels that are being used in the LTE system may include a PCFICH (Physical Control Format Indicator Channel), a PDCCH (Physical Downlink Control Channel), a PHICH (Physical Hybrid ARQ Indicator Channel), and so on. The PCFICH carries information on the number of OFDM symbols being transmitted from the first OFDM symbol of a subframe and being used in the control channel transmission within the subframe. The PHICH corresponds to a response to an uplink transmission, and the PHICH carries HARQ ACK/NACK (acknowledgment/negative-acknowledgment) signals. The control information being transmitted through the PDCCH is referred to as DCI (Downlink Control Information). The DCI includes uplink or downlink scheduling information or an uplink Transmit Power Control Command for an arbitrary user equipment (UE) group.

The DCI format may be defined as formats, such as Formats 0, 3, 3A, and 4 for the usage in an uplink, Formats 1, 1A, 1B, 1C, 1D, 2, 2A, 2B, and 2C, and so on, for the usage in a downlink. The information field type, the number of information fields, the number of bits of each information field, and so on, may vary depending upon the DCI format. For example, depending upon its purpose, the DCI format selectively (or optionally) includes information on hopping flag, RB allocation, MCS (modulation coding scheme), RV (redundancy version), NDI (new data indicator), TPC (transmit power control), HARQ processing number, PMI (precoding matrix indicator) confirmation, and so on. Accordingly, the size of the control information being matched to the DCI format may vary depending upon the DCI format. Meanwhile, an arbitrary DCI format may be used for performing two or more different types of control information transmission. For example, DCI Formats 0/1A may be used for carrying DCI Format 0 or DCI Format 1, and these DCI Formats are differentiated from one another by a flag field.

The PDCCH may carry a transmission format and resource allocation information of a DL-SCH (Downlink Shared Channel), a transmission format and resource allocation information of a UL-SCH (Uplink Shared Channel), paging information of a PCH (paging channel), system information of the DL-SCH, resource allocation information of a higher-layer control message, such as a Random Access Response being transmitted over the PDSCH, a transmission power control command on individual UEs within an arbitrary UE group, activation of a VoIP (voice over IP), and so on. A plurality of PDCCHs may be transmitted within the control region. The UE may monitor the plurality of PDCCHs. The base station may decide a PDCCH format in accordance with the DCI, which is to be transmitted to the UE, and may add a CRC (Cyclic Redundancy Check) to the control information. Depending upon the owner of the PDCCH or the usage purpose of the PDCCH, the CRC may be masked to an identifier (e.g., an RNTI (radio network temporary identifier). If the PDCCH is designated to a particular (or specific) UE, an identifier (e.g., C-RNTI (cell-RNT)) of the corresponding UE is masked to the CRC. In another example, if the PDCCH is designated to a paging message, a paging indicator identifier (e.g., P-RNTI (paging-RNTI)) is masked to the CRC. If the PDCCH is related to system information (more specifically, to a system information block (SIB), which will be described later on), a system information identifier (e.g., S-RNTI (system information RNTI)) is masked to the CRC. In order to indicate a random access response, which corresponds to a response respective to the transmission of a random access preamble of the user equipment, a RA-RNTI (random access-RNTI) may be masked to the CRC.

The PDCCH carries a message, which is known as the DCI (Downlink Control Information), and the DCI includes resource allocation for one user equipment or one user equipment group and other control information. Generally, multiple PDCCUs may be transmitted within a single subframe. Each PDCCH is transmitted by using one or more CCEs (control channel elements), and each CCE corresponds to 9 sets of 4 resource elements. The 4 resource elements are collectively referred to as a REG (resource element group). And, 4 QPSK symbols are mapped to one REG. The resource element that is allocated to a reference signal is not included in the REG, and, due to such exception, a total number of REGs within a given OFDM symbol varies depending upon the presence or absence of a cell-specific reference signal. The concept of REG (i.e., group unit mapping, wherein each group includes 4 resource elements) is also used in another downlink control channel (PCFICH and PHICH). More specifically, the REG is used as a basic resource unit in the control region.

Transmission modes for configuring the multi-antenna technology and information content of the DCI formats are listed below.

Transmission Mode
Transmission Mode 1: transmission from a single base station antenna port
Transmission Mode 2: transmission diversity
Transmission Mode 3: open-loop spatial multiplexing
Transmission Mode 4: closed-loop spatial multiplexing
Transmission Mode 5: MU-MIMO
Transmission Mode 6: closed-loop rank-1 precoding
Transmission Mode 7: transmission using UE-specific reference signal
DCI Format
DCI Format 0: resource grant for PUSCH transmission (uplink)
DCI Format 1: resource allocation for single codeword PDSCH transmission (Transmission Modes 1, 2, and 7)
DCI Format 1A: Compact signaling of resource allocation for single codeword PDSCH (all Transmission Modes)
DCI Format 1B: Compact resource allocation for PDSCH (Mode 6) using rank-1 closed loop precoding
DCI Format 1C: Extremely compact resource allocation for PDSCH (e.g., paging/broadcast system information)
DCI Format 1D: Compact resource allocation for PDSCH (Mode 5) using multiple-user MIMO
DCI Format 2: Compact resource allocation for PDSCH (Mode 4) of closed-loop MIMO operation
DCI Format 2A: Compact resource allocation for PDSCH (Mode 3) of open-loop MIMO operation
DCI Format 3/3A: Power control command having 2-bit/1-bit power control value for PUCCH and PUSCH Table 3 shows an example of control information being transmitted by DCI Format 0. As shown below, the bit size of each information field is merely exemplary, and therefore, the bit size of the fields will not be limited only to the example presented herein.

Table 3

TABLE 3

| Information field | Bit (2) |
| --- | --- |
| (1) Flag for format0/format1A differentiation | 1 |
| (2) Hopping flag | 1 |
| (3) Resource block assignment and hopping resource allocation | $\lceil \log_2(N_{RB}^{UL}(N_{RB}^{UL}+1)/2) \rceil$ |
| (4) Modulation and coding scheme and redundancy version | 5 |
| (5) New data indicator | 1 |
| (6) TPC command for scheduled PUSCH | 2 |
| (7) Cyclic shift for DM RS | 3 |
| (8) UL index (only for TDD) | 2 |
| (9) CQI request | 1 |

A flag field corresponds to an information field that is configured for differentiating Format 0 and Format 1A. More specifically, each of DCI formats 0 and 1A has the same payload size and is differentiated from one another by the flag field. In a resource block allocation and hopping resource allocation field, a bit size of the corresponding field may vary depending upon whether the PUSCH corresponds to a hopping PUSCH or a non-hopping PUSCH. A resource block allocation and hopping resource allocation field for a non-hopping PUSCH provides $\lceil \log_2(N_{RB}^{UL}(N_{RB}^{UL}+1)/2) \rceil$ bits to resource allocation of a first slot within an uplink subframe. Herein, $N_{RB}^{UL}$ corresponds to a number of resource blocks being included in the uplink slot, and $N_{RB}^{UL}$ is decided in accordance with an uplink transmission bandwidth, which is configured in the cell. Therefore, a payload size of DCI Format 0 may vary in accordance with an uplink bandwidth. DCI Format 1A includes an information field for PDSCH allocation, and a payload size of DCI Format 1A may vary in accordance with a downlink bandwidth. DCI Format 1A provides a reference information bit size with respect to DCI Format 0. Therefore, in case the number of information bits of DCI Format 0 is smaller than the number information bits of DCI Format 1A, '0's are added to the DCI Format 0 until the payload size of DCI Format 0 becomes equal to the payload size of DCI Format 1A. The added '0's fill a padding field of the corresponding DCI format.

Figure 5:
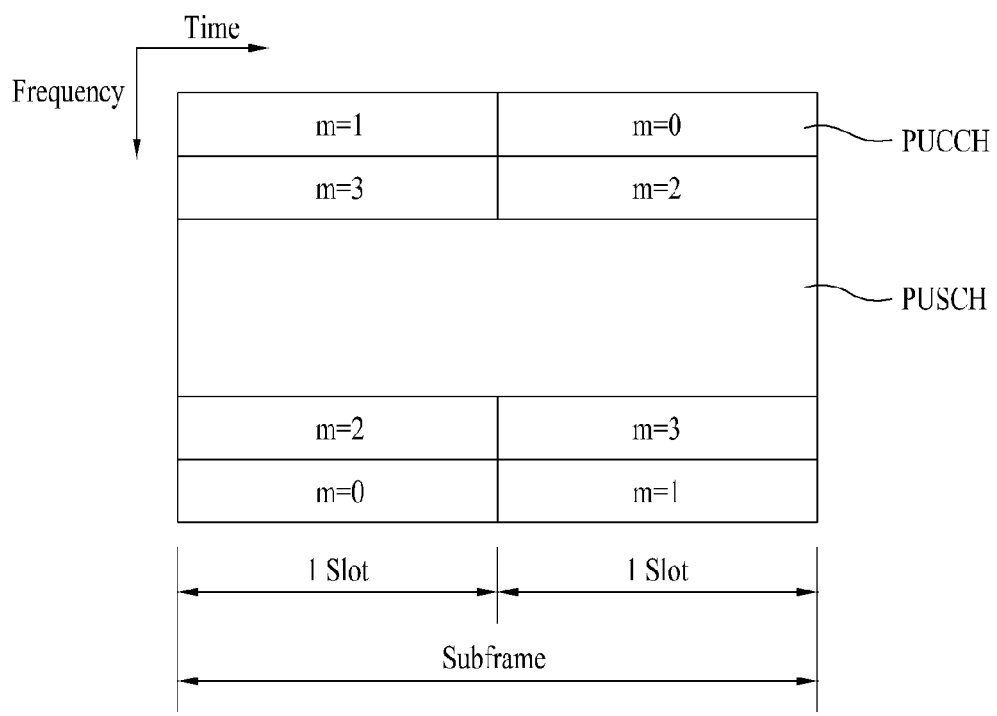
FIG. 5 illustrates an exemplary structure of an uplink subframe being used in 3GPP LTE.

FIG. 5 illustrates an exemplary structure of an uplink subframe being used in 3GPP LTE.

Referring to FIG. 5, an uplink subframe includes multiple slots (e.g., two (2) slots). Each slot may include different numbers of SC-FDMA symbols depending upon a CP length. For example, in case of a normal CP, a slot may include seven (7) SC-FDMA symbols. The uplink subframe is divided into a data region and a control region. The data region includes a PUSCH and is used for transmitting data signals, such as voice, and so on. The control region includes a PUCCH and is used for transmitting control information. The PUCCH includes an RB pair (e.g., m=0, 1, 2, 3) located at each end portion of the data region in a frequency axis and hops at a slot boundary. The control information includes HARQ ACK/NACK, CQI (Channel Quality Information), PMI (Precoding Matrix Indicator), RI (Rank Indication), and so on.

FIG. 6 illustrates an exemplary pattern of a reference signal being mapped to a downlink resource block (RB) pair, which is defined in an LTE system.

A downlink reference signal may be categorized as a CRS (Common RS), which is shared by all user equipments existing within one cell, and a DRS (Dedicated RS), which is dedicated to one specific user equipment. The transmitting end may provide information for demodulation and channel measurement by using such reference signals (CRS, DRS).

The receiving end (e.g., user equipment) may measure the channel status by using the CRS, and, then, the receiving end may feed-back indicators related to the channel quality, such as CQI (Channel Quality Indicator), PMI (Precoding Matrix Index) and/or RI (Rank Indicator), to the transmitting end (e.g., base station) in accordance with the measured channel status. In the exemplary embodiments of the present invention, the CRS may also be referred to as a cell-specific RS. Conversely, a reference signal related to feedback of the channel status information (CSI) may be referred to as a CSI-RS.

In case data demodulation is required within the PDSCH, the DRS may be transmitted to the user equipments through resource elements. The user equipment may receive information on the existence or absence of a DRS via higher layer signaling. The DRS is valid only when a respective PDSCH signal is mapped to the DRS. In the exemplary embodiments of the present invention, the DRS may also be referred to as a UE-specific RS or a DMRS (Demodulation RS).

As a mapping unit of the reference signal, a downlink RB (Resource Block) pair may be configured of one subframe in a time domain×12 subcarriers in a frequency domain. More specifically, in the time axis (x-axis), in case of a normal CP (Cyclic Prefix), one resource block pair has a length of 14 OFDM symbols (ref FIG. 6(a)), and, in case of an extended CP (Cyclic Prefix), one resource block pair has a length of 12 OFDM symbols (ref FIG. 6(b)).

Referring to FIG. 6, each resource elements (REs), which is respectively marked as '0', '1', '2', and '3' in each resource block, refers to a resource element having a CRS corresponding to each of antenna ports '0', '1', '2', and '3' of a transmitting terminal (e.g., base station) mapped thereto, and resource elements marked as 'D' refer to resource elements having DRS mapped thereto.

Figure 7:
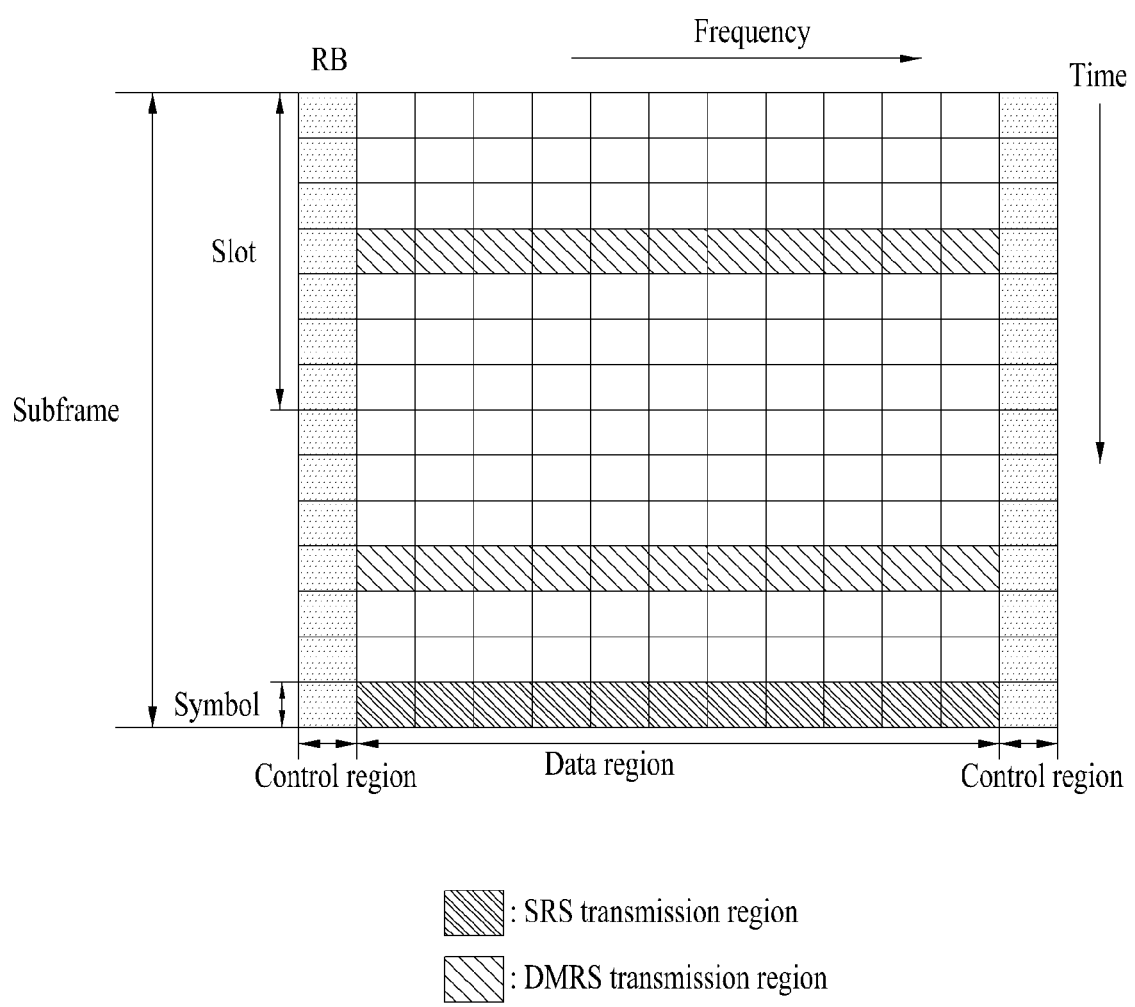
FIG. 7 illustrates an exemplary reference signal being used in an uplink subframe of an LTE system.

FIG. 7 illustrates an exemplary reference signal being used in an uplink subframe of an LTE system.

Referring to FIG. 7, a SRS (Sounding Reference Signal) may be periodically or aperiodically transmitted by a user equipment in order to estimate a channel respective to an uplink band (sub band) other than a band through which PUSCH is transmitted, or in order to acquire information on a channel corresponding to an overall uplink bandwidth (wide band). In case of periodically transmitting the sounding reference signal, the transmission cycle period (or interval) is decided through higher layer signaling, and, in case of the aperiodic transmission of the sounding reference signal, the base station may direct (or indicate) the transmission by using a 'SRS request' field of a PDCCH uplink/downlink DCI format or may transmit a triggering message. As shown in the example of FIG. 7, a region to which the sounding reference signal can be transmitted within a subframe corresponds to a section having a SC-FDMA symbol located at a very last position along the time axis within a subframe. Sounding reference signals of multiple user equipment, which are being transmitted to the last SC-FDMA of the same subframe may be differentiated from one another in accordance with the frequency position. Unlike the PUSCH, the sounding reference signal does not perform DFT (Discrete Fourier Transform) for converting the SC-FDMA, and the sounding reference signal is transmitted without using a precoding matrix, which is used in the PUSCH.

Furthermore, a region to which a DMRS (Demodulation-Reference Signal) is being transmitted within a subframe correspond to a section having a SC-FDMA symbol located at a center position of each slot along the time axis, and, similarly, the DMRS is transmitted through a data transmission band along the frequency axis. For example, in a subframe having a normal CP applied thereto, the demodulation-reference signal is transmitted from a $4^{th}$ SC-FDMA symbol and an $11^{th}$ SC-FDMA symbol.

The demodulation-reference signal may be combined with a PUSCH or PUCCH transmission. The sounding reference signal corresponds to a reference signal, which is transmitted by the user equipment to the base station for uplink scheduling. The base station estimates an uplink channel through the received sounding reference signal and uses the estimated uplink channel for uplink signaling. The same type of basic sequence may be used for the demodulation-reference signal and the sounding reference signal. Meanwhile, in an uplink multi-antenna transmission, the precoding that is applied to the demodulation-reference signal may be the same as the procoding that is applied to PUSCH.

Figure 8:
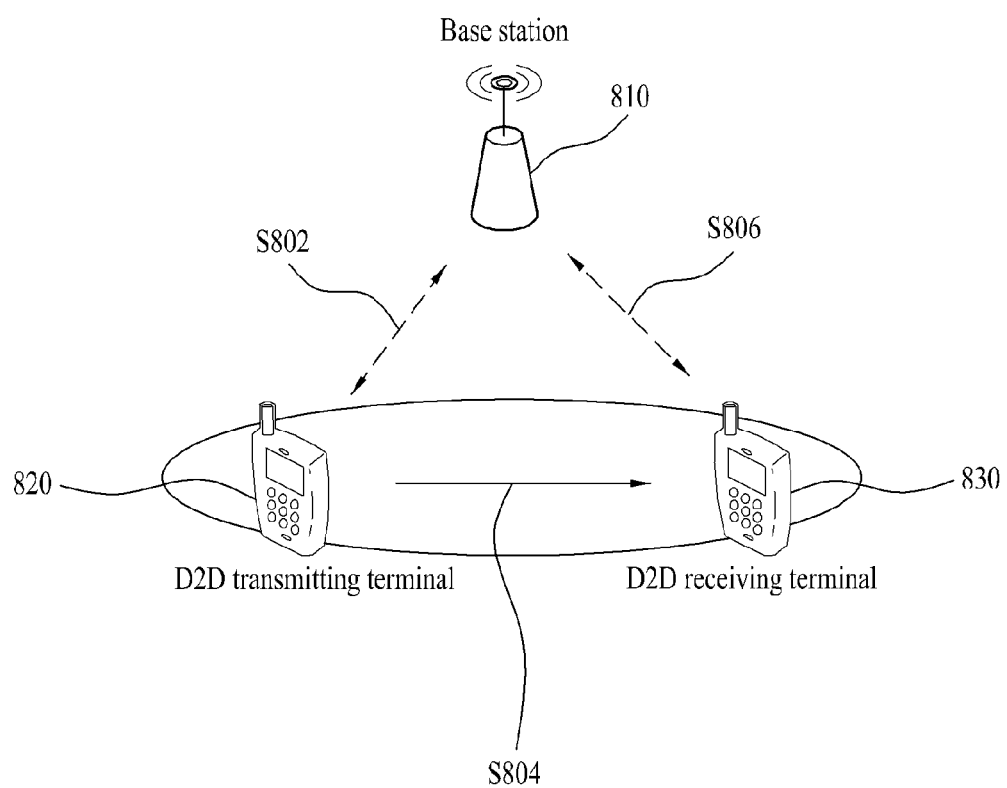
FIG. 8 illustrates an example of a D2D (Device to Device) communication system.

FIG. 8 illustrates an example of a D2D (Device to Device) communication system. Although the description is mainly based on a one-to-one D2D communication, the description may also be applied to one-to-many or many-to-one D2D communication links, and, alternatively, the description may also be applied to a case when a cellular communication link and a D2D communication link co-exist. In this specification, unlike the conventional communication method wherein connection between user equipments (or terminals) is established through a base station, D2D communication refers to a communication method wherein data signals are exchanged to and from user equipments through a direct communication link.

Referring to FIG. 8, 2 (two) D2D user equipments (820, 830) supporting D2D communication are illustrated, and a base station, (810) controlling communication between the D2D user equipments (820, 830) is also illustrated. A D2D transmitting terminal (820) may transmit/receive control information to/from the base station (810) (S802). For example, the D2D transmitting terminal (820) may receive control information, which is configured to schedule data transmission resources, from the base station (810) through a downlink control channel (e.g., PDDCH). Additionally, for example, the D2D transmitting terminal (820) may receive control information, which includes a command related to power for data transmission, from the base station (810) through a downlink control channel (e.g., PDDCH).

The D2D transmitting terminal (820) may transmit data to a D2D receiving terminal (830) by using the control information, which is received from the base station (810) (S804). For example, the D2D transmitting terminal (820)

may receive a control channel (e.g., PDCCH), which schedules a data channel (e.g., PUSCH or PDSCH), from the base station (810), and the D2D transmitting terminal (820) may transmit data to the D2D receiving terminal (830) through the scheduled data channel. At this point, the D2D transmitting terminal (820) may control (or adjust) power required for performing data transmission by using the power control information, which is received from the base station (810).

The D2D receiving terminal (830) may also receive control information from the base station (810) (S806), and the D2D receiving terminal (830) may receive data being transmitted from the D2D transmitting terminal (820) by using the received control information (S804). For example, the D2D receiving terminal (820) may receive a control channel (e.g., PDCCH), which schedules a data channel (e.g., PUSCH or PDSCH), from the base station (810), and the D2D receiving terminal (820) may receive data being transmitted from the D2D transmitting terminal (830) through the scheduled data channel.

Additionally, the D2D receiving terminal (830) may transmit feedback information respective to the control signal and/or data signal, which is received from the D2D transmitting terminal (820), to the base station (810) (S804). For example, the D2D receiving terminal (830) may measure a channel status by using the control signal (e.g., RS), which is transmitted from the D2D transmitting terminal (820), and, then, the D2D receiving terminal (830) may report the measured channel status (e.g., CQI) to the base station (810). Additionally, for example, the D2D receiving terminal (830) may receive a data signal, which is transmitted from the D2D transmitting terminal (820), and, then, the D2D receiving terminal (830) may report an acknowledgement response (ACK) or a negative acknowledgement (NACK) respective to the received data to the base station (810).

In FIG. 8, although it is described that the D2D terminals (820, 830) transmit and receive control information through the base station (810), and that only data information is being transmitted between the D2D terminals (820, 830), the D2D communication method will not be limited only to the example of FIG. 8. For example, the D2D terminals (820, 830) may also be capable of directly transmitting and receiving control information and/or data information to and from one another without any intervention from the base station (810).

When performing such D2D communication, depending upon the transmission power of the D2D transmitting terminal (820), interference may influence other user equipments or the base station. Therefore, in order to reduce interference, it may be preferable to have the transmission power of the D2D transmitting terminal (820) controlled by the base station (810). The present invention proposes diverse information required for performing power control of the D2D transmitting terminal, a method for feeding back such information, and power control and coding rate control method using such information, when performing D2D communication.

Figure 9:
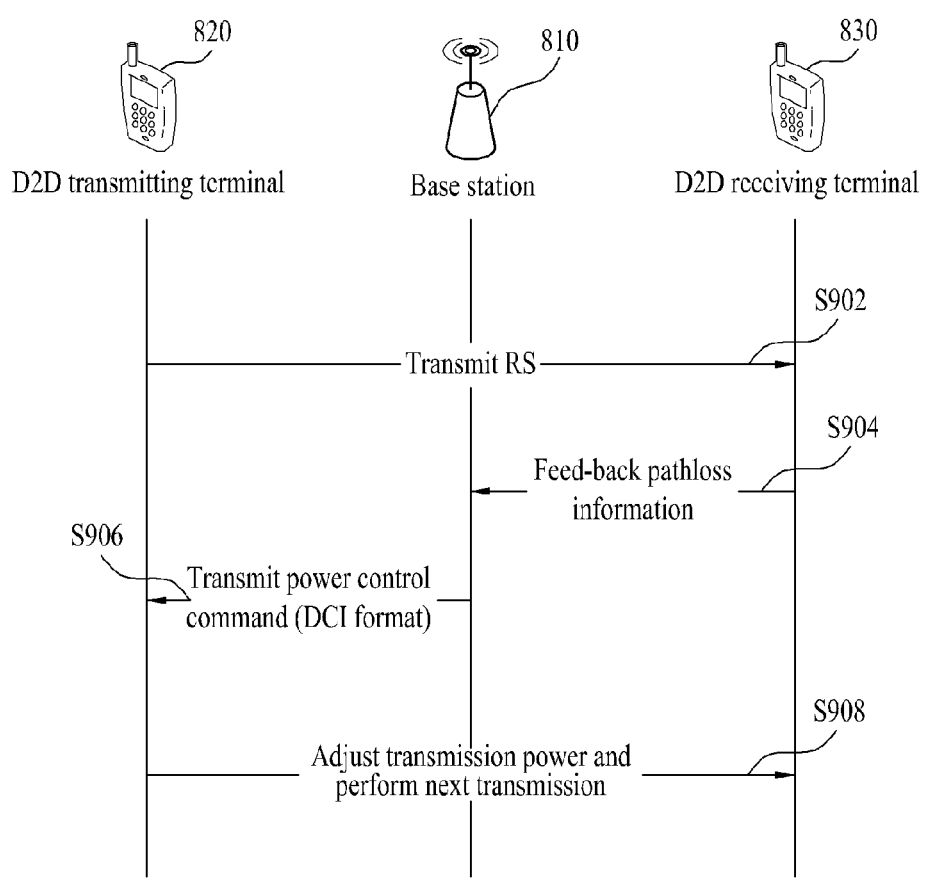
FIG. 9 illustrates an exemplary method for controlling transmission power by using a reference signal according to an exemplary embodiment of the present invention.

FIG. 9 illustrates an exemplary method for controlling transmission power by using a reference signal according to an exemplary embodiment of the present invention.

Referring to FIG. 9, the D2D transmitting terminal (820) may transmit a reference signal (RS) for measuring pathloss (PL) (S902). For simplicity in the description, the reference signal for measuring pathloss may be referred to as PL RS. For example, the D2D transmitting terminal (820) may use a SRS (sounding RS), which is used for measuring uplink pathloss in a conventional LTE-A system, as the PL RS. In another example, based upon the fact that a distance of D2D communication is shorter than a base station-user equipment distance (distance between base station and user equipment), a newly devised RS may also be used. At this point, in order to measure the pathloss of an overall frequency band, which is used by the D2D transmitting terminal, it is preferable for the PL RS to perform transmission by using a symbol through the entire frequency band. However, in another example, in order to reduce the transmission power, a symbol of a narrow band may be transmitted by performing hopping in accordance with a time interval based upon a pre-decided rule. Whether to use a symbol through the entire frequency band, or whether to use a symbol of a narrow band may, for example, be decided by higher layer signaling, such as RRC signaling.

Although the PL RS may be repeatedly transmitted according to a pre-decided consistent cycle (or interval), the transmission interval may be semi-statically varied by higher-layer signaling, such as RRC signaling.

In case there is no previously established D2D communication link, the transmission power of the PL RS may be configured (or set up) to a pre-decided initial value, and, in case there is a previously established D2D communication link, the transmission power that was used for performing the most recent (or final) communication with the D2D receiving terminal may be configured (or set up) as the transmission power of the PL RS.

In order to reduce power consumption of the D2D transmitting terminal (820) and to increase transmission rate, the D2D receiving terminal (830) may feed-back diverse information to the base station (810) (S904). For example, information being fed-back to the base station may include pathloss information of D2D communication, which is measured by the D2D receiving terminal (830) through the PL RS, which is transmitted by the D2D transmitting terminal (820). As described above, for example, by using the higher layer signaling (e.g., RRC signaling), which has been received in advance, the D2D receiving terminal (830) may be capable of knowing at which point and through which frequency band the PL RS is being transmitted from the D2D transmitting terminal (820).

After receiving the PL RS of the D2D transmitting terminal (820) through a time-frequency resource, which is decided by a higher layer signaling, the D2D receiving terminal (830) calculates pathloss information based upon pre-decided PL RS transmission power and PL RS reception power, and, then, the D2D receiving terminal (830) may feed-back the calculated pathloss information to the base station (810). In another example, the PL RS reception power value itself (raw data) may be fed-back to the base station (810) without calculating the pathloss information. By using the above-described method, since a higher layer decides the PL RS transmission/reception resource, even if a PL RS is respectively received from multiple D2D terminals, the D2D receiving terminal (830) may identify each PL RS.

As an example of realizing pathloss feedback, channel information may be fed-back through an uplink control channel (e.g., PUCCH) or an uplink data channel (e.g., PUSCH) of the D2D receiving terminal (830), which is similar to the conventional LTE-A system. Additionally, feedback may be periodically performed or may be performed upon request or may be performed by a combination of both methods, which is also similar to the conventional LTE-A system.

As another example of realizing pathloss feedback, after calculating the pathloss information, the D2D receiving terminal (830) may multiplex (or add) the pathloss information to the PL RS, which is transmitted by the D2D receiving terminal (830), and, then, the D2D receiving terminal (830) may transmit the processed PL RS. When a D2D communication link is established, since a two-way communication is performed between the D2D transmitting terminal (820) and the D2D receiving terminal (830), both the D2D transmitting terminal (820) and the D2D receiving terminal (830) transmit the PL RS at a predetermined consistent cycle period (or interval). At this point, a D2D terminal measures the pathloss of a counterpart D2D terminal and, then, selects a PL RS best-fitting the measured result value and transmits the selected PL RS. The diverse types of PL RS may entirely correspond to a completely different sequence (or numerical progression). However, only a specific portion (e.g., only a last few bits may be different or only a phase of the sequence may be different) of the diverse types of PL RS may also correspond to a different sequence.

The base station (810) may decide one of a transmission power and an MCS level of the D2D transmitting terminal (820) by using the information received from the D2D receiving terminal (830). The transmission power and the MCS level may be decided based upon the influence of interference on the entire network. More specifically, a reference standard for deciding the transmission power and the MCS level may correspond to a receiving performance (reception power) of the D2D receiving terminal (830) or the influence of the interference on other (D2D) terminals or terminals of other cells. After deciding one of the transmission power and the MCS level, the base station (810) may transmit information on at least one of the decided transmission power and the decided MCS level to the D2D transmitting terminal (820) through a downlink control channel (S906). For example, the base station (810) may transmit the transmission power and the MCS level to the D2D transmitting terminal (820) by allocating the transmission power and the MCS level to a TPC (transmit power control) field and an MCS field of DCI formats 0/3/3A corresponding to PDCCH. In this example, a method of performing allocation to the TPC field is preferable in that, based upon a current transmission power, the number of bits may be reduced by expressing the allocation by using a differential method. Additionally, the MCS level may also be allocated by using a differential method. Furthermore, when required, the changed MCS level may also be transmitted to the D2D receiving terminal (830), so that the MCS level of the D2D transmitting terminal (820) can be notified before the next D2D reception.

In this example, although the transmission power and the MCS level may be controlled (or adjusted) by using an instantaneous method, the transmission power and the MCS level may also be controlled (or adjusted) by reflecting long-term change. For example, in a fast fading situation, pathloss update cannot be performed at each time of reception, and it may also be difficult to instantaneously reflect the transmission power and the MCS level. In this situation, after accumulating the information, which is fed-back from the D2D receiving terminal (830), the base station (810) may estimate an average value at each consistent interval (or cycle period) and may transmit a command for controlling the transmission power and the MCS level. A change interval (or cycle period) and a change subframe timing of the transmission power and the MCS level may be notified by a higher layer signaling (e.g., RRC signaling). In this case, the change subframe timing may allocate a corresponding value to TPC, MCS fields of DCI formats 0/3/3A. In a subframe timing other than the change subframe timing, values indicating that the transmission power and the MCS level are not changed may be allocated to the TPC, MCS fields of DCI formats 0/3/3A, or the corresponding fields may be used as fields of other purposes.

Meanwhile, each of the D2D terminals (820, 830) is aware of being in a D2D communication status, and the base station (810) is also aware that each of the D2D terminals (820, 830) is in a D2D communication status. Therefore, when deciding the value of the TPC field of DCI formats 0/3/3A, although a mapping table of the conventional LTE-A may be followed, an adequate power control value (e.g., $\delta PUSCH,c$) may be newly mapped to each value. In the LTE-A system, in an aspect of using limited resources, a large amount of status is allocated to a solution for increasing power (e.g., $\{-1, 0, 1, 3\}$). However, in case of D2D communication, since resource reuse is performed frequently, the D2D communication may cause unexpected interference to other terminals or D2D terminals. Accordingly, in case of D2D communication, in order to efficiently perform power control, it will be advantageous to allocate a larger amount of status to a solution for reducing transmission power. Allocating a larger amount of status to a solution for reducing transmission power may indicate that, among the power control values indicated by the power control command (e.g., TPC field), a number of negative values is greater than or equal to a number of positive values. Conversely, allocating a larger amount of status to a solution for increasing transmission power may indicate that, among the power control values indicated by the power control command (e.g., TPC field), a number of negative values is less than or equal to a number of positive values. Table 4 shows an exemplary TPC field mapping table according to an exemplary embodiment of the present invention. $\delta PUSCH,c$ of Table 4 may be referred to as $\Delta D2D$.

Table 4

TABLE 4

| TPC field value of DCI Format 3 | Accumulated $\delta PUSCH,c$ [dB] in case of D2D communication |
|---|---|
| 0 | −3 |
| 1 | −1 |
| 2 | 0 |
| 3 | 1 |

For example, in Table 4, if the TPC field value of DCI Format 3 is equal to 0, this indicates that the power control value is equal to −3 dB. Additionally, if the TPC field value of DCI Format 3 is equal to 3, this indicates that the power control value is equal to 1 dB. Table 4 is merely exemplary, and, therefore, the values $\{-3, -1, 0, 1\}$ may be assigned to values other than the TPC field values shown in Table 4. For example, in another example, if the TPC field value of DCI Format 3 is equal to 3, this may indicate that the power control value is equal to −3 dB. Similarly, if the TPC field value of DCI Format 3 is equal to 0, this may indicate that the power control value is equal to 1 dB.

Additionally, in Table 4, although the power control values are mapped by using an accumulation method, which is similar to the conventional LTE-A system, in other examples, the power control values may be mapped by using an absolute method.

The D2D transmitting terminal (820) may decode the TPC and MCS fields of DCI Formats 0/3/3A, and the D2D transmitting terminal (820) may control the transmission power and MCS level of the D2D transmitting terminal (820) to best-fit the corresponding values (S908). Subsequently, the D2D transmitting terminal (820) may transmit a data channel to the D2D receiving terminal (830) in accordance with the controlled (or adjusted) transmission power and MCS level.

In the example shown in FIG. 9, each process step has been categorized for simplicity in the description, and, therefore, each process step may be independent from one another. Each process step may be combined with another process step so as to configure a new process step. And, the details of each step may be further segmented, wherein part of the segmentation may be integrated or omitted or further simplified.

Figure 10:
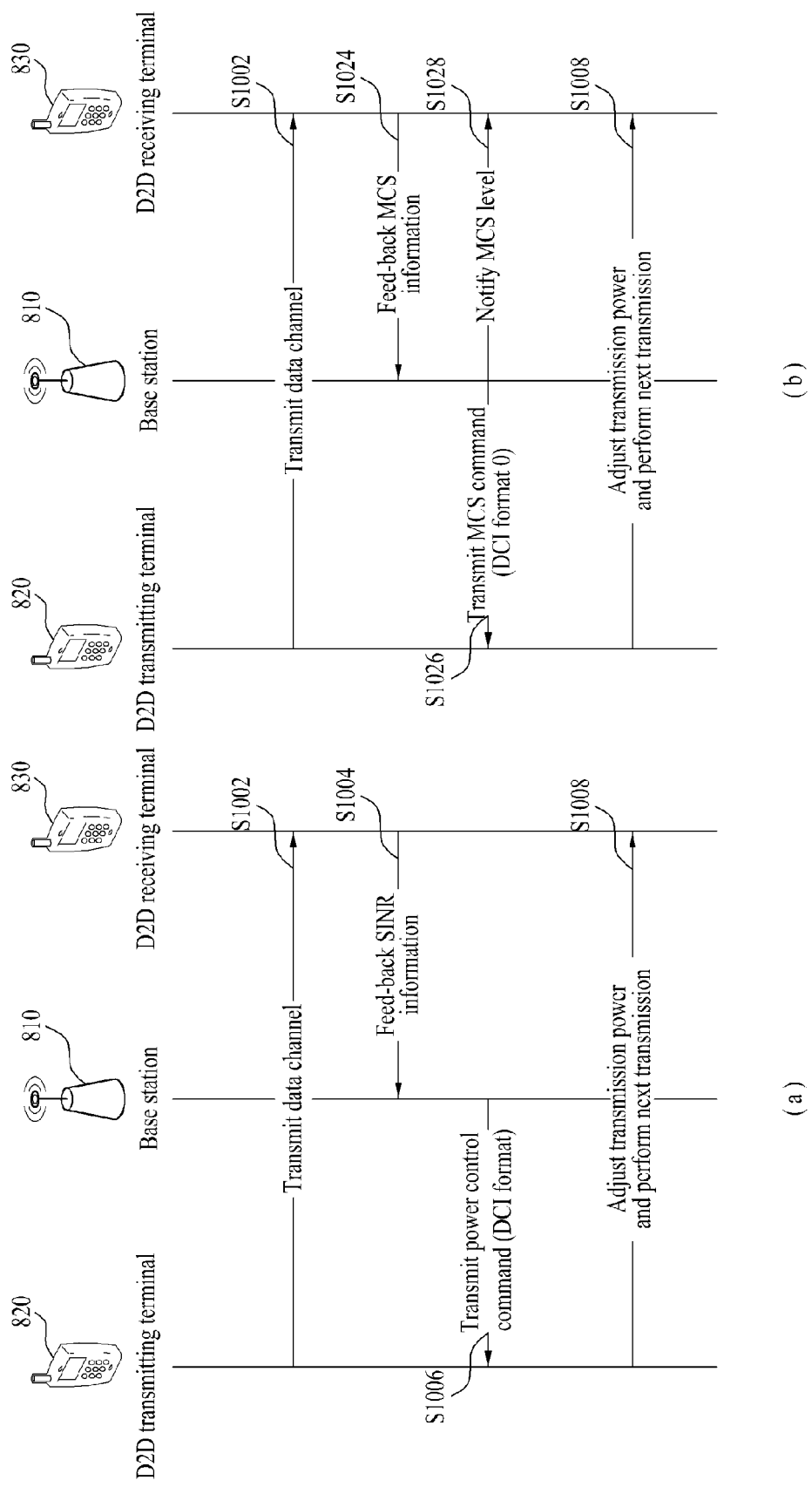
FIG. 10 illustrates an exemplary method for controlling transmission power by using a data channel according to an exemplary embodiment of the present invention.

FIG. 10 illustrates an exemplary method for controlling transmission power by using a data channel according to an exemplary embodiment of the present invention. FIG. 10(a) and FIG. 10(b) respectively illustrate an example of having the D2D receiving terminal (830) receive a data channel from the D2D and having the D2D receiving terminal (830) transmit a SINR (Signal to Interference plus Noise Ratio) information or an MCS (modulation and coding scheme) level as the respective feedback information. Herein, the exemplary embodiments of FIG. 10(a) and FIG. 10(b) may be independently performed or may be performed in combination.

Referring to FIG. 10, the D2D transmitting terminal (820) may transmit data to the D2D receiving terminal (830) through a data channel, which is scheduled by the base station (810). In this case, for example, PUSCH or PDSCH may be used as the data channel, and control information scheduling such data channel may be received by the D2D transmitting terminal (820) through PDCCH. For example, in case an uplink data channel is being used in the D2D transmitting terminal (820), the D2D receiving terminal (830) may receive data through a downlink data channel, and the base station (810) may transmit control information also scheduling the downlink data channel respective to the D2D receiving terminal (830).

In step S1002, after receiving a data channel (e.g., PDSCH or PUSCH) from the D2D transmitting terminal (820) and decoding the received data channel, in case the D2D transmitting terminal (820) has successfully performed data decoding, the D2D receiving terminal (830) may recover the initial data and calculate SINR information. For example, the calculated SINR information may correspond to a difference ($\Delta$SINR) between a received SINR and a target SINR. In another example, the calculated SINR information may correspond to an absolute SINR value (or the SINR value itself). In yet another example, the calculated SINR information may correspond to a SINR margin. Moreover, the SINR information may be calculated with respect to a specific subframe, or the SINR information may be calculated as a mean value (or average value) respective to a mean (or average) of multiple subframes. The D2D receiving terminal (830) may transmit the calculated SINR information or may feed-back coding rate information to the base station (810) (S1004). For example, if the current SINR value is more sufficient than a SINR value required by a decoding method, which is currently used by the D2D receiving terminal (830), the D2D receiving terminal (830) may send a feedback to the base station (810) so as to reduce the transmission power of the D2D transmitting terminal (820) or to increase the MCS level (or to increase the coding rate). Conversely, if the current SINR value is equal to or less than a SINR value required by a decoding method, which is currently used by the D2D receiving terminal (830), the D2D receiving terminal (830) may send a feedback to the base station (810) so as to increase the transmission power of the D2D transmitting terminal (820) or to decrease the MCS level (or to reduce the coding rate).

At this point, although it is preferable that the feedback information is fed-back by using a differential value respective to the current value, an absolute value may also be fed-back.

Similarly, as shown in FIG. 10(b), the D2D receiving terminal (830) may feed-back MCS level information by using the calculated SINR information (S1024). When it is determined by the D2D receiving terminal (830) that the current SINR value is also suitable for a MCS level that is one level higher, the D2D receiving terminal (830) may request for the MCS level to be increased. Conversely, if it is determined that the current SINR value is suitable for a MCS level that is one level lower, the D2D receiving terminal (830) may request for the MCS level to be decreased. At this point, although it is preferable that feedback information is fed-back by using a differential method respective to the current value, an absolute value may also be fed-back.

The feedback information of S904, the feedback information of S1004, and the feedback information of S1024 may each be separately transmitted to the base station (810), or the feedback information may be combined and simultaneously transmitted to the base station (810).

As an example of realizing feedback of the SINR information and the MCS level information, SINR information and/or MCS level information may be fed-back to an uplink control channel (e.g., PUCCH) along with an ACK/NACK signal. In case of the above-described pathloss, since the change interval is slow (or long), it will be more advantageous to use the PL RS, which is being transmitted at a consistent interval, it may be preferable to perform feedback of the SINR information and/or MCS level information immediately after receiving the data channel. Therefore, the SINR information and/or MCS level information may be fed-back by performing multiplexing (or piggyback) with another signal (e.g., ACK/NACK) of an uplink control channel (e.g., PUCCH) being transmitted with respect to the reception of a data channel or by creating a new field. For example, 8 PSK may be used by expanding a constellation of the PUCCH format (e.g., PUCCH Format 1a/1b, QPSK only), which uses a single modulation method. In this case, with the constellation expansion, an additional feedback status of 1 bit or 2 bits may be gained.

In another example, in case of PUSCH piggyback or in case a number of source bits is variable, as in PUCCH Format 3, diverse feedback statuses may be simultaneously transmitted by changing the coding rate. For example, in PUCCH Format 3, a feedback respective to a data channel being transmitted by the D2D transmitting terminal (820) and a feedback respective to a PDCCH of the base station (e.g., SINR1, SINR2 MCS1, MCS2) may be simultaneously transmitted by the D2D receiving terminal (830). Such status value may correspond to a value that is calculated in one subframe, or such status value may correspond to result respective to multiple subframes. Additionally, by adding a larger number of bits to the feedback status, a larger number of bits may be channel-coded and transmitted.

The base station (810) may decide a transmission power and an MCS level of the D2D transmitting terminal (820) by using the information received from the D2D receiving terminal (830). The transmission power and the MCS level may be decided based upon the influence of interference on the entire network. More specifically, a reference standard for deciding the transmission power and the MCS level may correspond to a receiving performance (reception power) of the D2D receiving terminal (830) or the influence of the interference on other (D2D) terminals or terminals of other cells. After deciding the transmission power and the MCS level, the base station (810) may transmit information on the decided transmission power and the decided MCS level to the D2D transmitting terminal (820) through a downlink control channel (S1006, S1026). Additionally, the MCS level may also be allocated by using a differential method. Furthermore, when required, the changed MCS level may also be transmitted to the D2D receiving terminal, so that the MCS level of the D2D transmitting terminal (820) can be notified before the next D2D reception (S1028). Since the description of S1006, S1026, and S1028 is similar to the description of S906, the detailed description of S906 may be directly applied to S1006, S1026, and S1028 without any modification.

However, in S1006, S1026, and S1028, as another method for transmitting a command, the base station (810) may calculate (or may calculate according to a predetermined rule) a mean value (or average value) of SINR feedback information of the D2D receiving terminal (830) during a predetermined time period and may add a new field to a random access parameter and may then transmit the command. For example, a new field may be added, or the calculated value may be transmitted as a relative value (ΔD2D) respective to a value that is used for deciding an initial PRACH transmission power (e.g., preambleInitialReceivedTargetPower).

The D2D transmitting terminal (820) may decode the TPC and MCS fields of DCI Formats 0/3/3A, and the D2D transmitting terminal (820) may control the transmission power and MCS level to best-fit the corresponding values. Subsequently, the D2D transmitting terminal (820) may transmit a PL RS signal or a data channel to the D2D receiving terminal (830) in accordance with the controlled (or adjusted) transmission power and MCS level (S1008).

Meanwhile, in case the D2D transmitting terminal (820) does not transmit an uplink control channel (e.g., PUCCH), the transmission power of the data channel (e.g., PUSCH) may be decided by Equation 1.

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

Equation 1

In Equation 1, an expression of $P_{O\_PUSCH,c}(j) = P_{O\_NOMINAL\_PUSCH,c}(j) + P_{O\_UE\_PUSCH,c}(j)$ may be made, and $P_{O\_NOMINAL\_PUSCH,c}(j)$ and $P_{O\_UE\_PUSCH,c}(j)$ correspond to values that are notified by a higher layer, and j corresponds to a value that is decided by the user equipment (or terminal) depending upon the usage of the data channel (e.g., PUSCH). As values currently used in LTE-A, j={0, 1, 2}, in case of j=0, the usage may correspond to a semi-persistent grant, and, in case of j=1, the usage may correspond to a dynamic scheduled grant, and, in case of j=2, the usage may correspond to a random access response grant. Therefore, it may be agreed upon that a case when j=3 is designated for data channel transmission for D2D. At, at this point, the value of $P_{O\_PUSCH,c}(j)$ may be decided as the transmission power for a D2D terminal (or user equipment), and the $P_{O\_PUSCH,c}(j)$ may be decided by $P_{O\_PUSCH,c}(j)$ = initial preamble power value + power control value received from base station. For example, the $P_{O\_PUSCH,c}(j)$ may be decided as $P_{O\_PUSCH,c}(j)$ = preambleInitialReceivedTargetPower+ΔD2D. Herein, in case of j=3, $\alpha_c(j)$ may also be newly defined as a pathloss coefficient of the D2D mode. For example, $\alpha_c(j)$ may be selected from a collection (or group) of multiple candidates A={a1, a2, . . . , an}, or $\alpha_c(j)$ may be decided as a fixed value, such as $\alpha_c(j)$=1.

At this point, the received $\delta_{PUSCH,c}$ may be reflected to a $f_c(j)$ term by using an accumulated method or an absolute method.

The exemplary embodiments shown in FIG. 9 and FIG. 10 may each be performed independently or may be combined with one another so as to configure a new embodiment. And, the details of each embodiment may be further segmented, wherein part of the segmentation may be integrated or omitted or further simplified.

Figure 11:
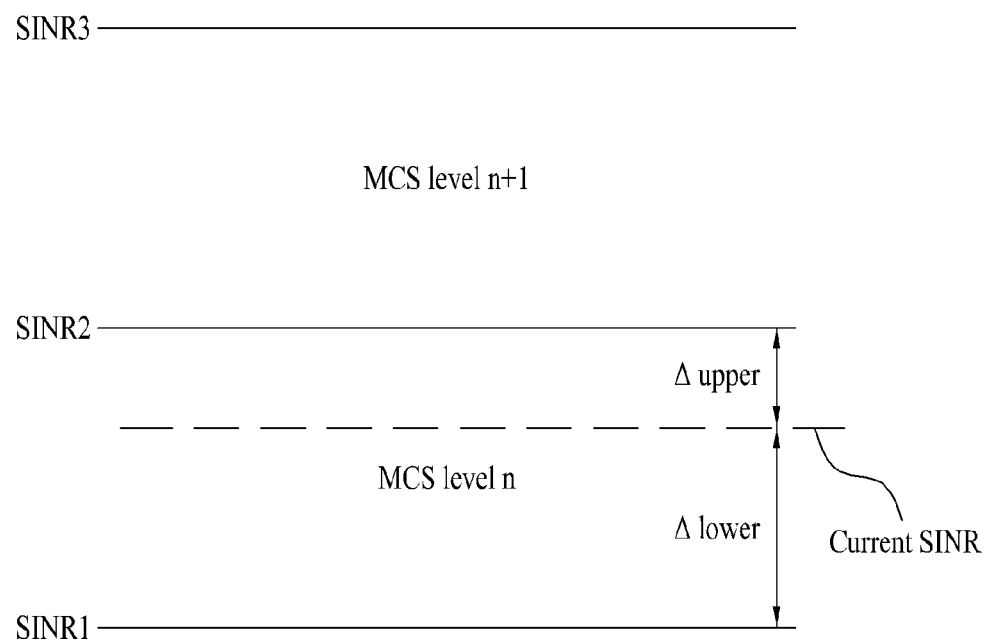
FIG. 11 illustrates an example of a D2D receiving end feeding-back SINR information to a SINR margin.

FIG. 11 illustrates an example of a D2D receiving terminal (830) feeding-back SINR information to a SINR margin. Referring to FIG. 11, the user equipment may report difference information (ΔSINR) between a SINR level capable of decoding an MCS, which is used in the received signal, to an adequate level (e.g., to a level at which a BLER (block error rate) can be equal to 10%) and a SINR level of the actual received signal to the base station (810). This may be interpreted as the user equipment reporting a margin value of a link quality (or user equipment transmission power), which can allow the user equipment to properly decode the used SINR. Such report may correspond to a measurement value respective to a user equipment signal transmission at a specific time point or may correspond to a measurement value observed from several transmission sessions over a relatively long time period. In the example of FIG. 11, it will be assumed that operation is performed at MCS level n, when a SINR range corresponds to [SINR1, SINR2], and that operation is performed at MCS level n+1, when a SINR range corresponds to [SINR2, SINR3]. At this point, the D2D receiving terminal may measure the SINR value, so as to feed-back a margin value (Δlower) respective to SINR1, which corresponds to a minimum value according to which the currently used MCS level n can be normally operated, or so as to feed-back a margin value (Δupper) respective to SINR2, which corresponds to a minimum value according to which the MCS level n+1 can be normally operated. Each value may correspond to a value calculated from one subframe, or each value may correspond to a value respectively calculated from multiple subframes.

Meanwhile, the exemplary operation SINR range for each MCS level of FIG. 11 may correspond to a value commonly notified by the base station with respect to an overall cell. However, the exemplary operation SINR range may also correspond to a value that is dependent upon different decoding methods or performances used by each user equipment.

Figure 12:
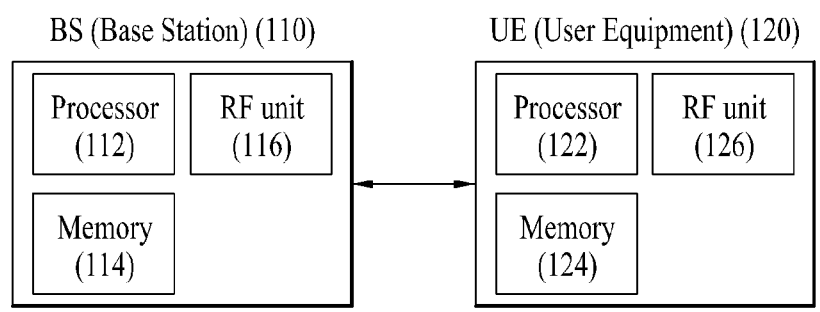
FIG. 12 illustrates examples of a base station and a user equipment that can be applied to the present invention.

FIG. 12 illustrates examples of a base station and a user equipment that can be applied to the present invention.

Referring to FIG. 12, a wireless communication system includes a base station (BS, 110) and a user equipment (UE, 120). In case the wireless communication system includes a relay, the base station or the user equipment may be replaced by the relay.

The base station (110) includes a processor (112), a memory (114), and a Radio Frequency (RF) unit (116). The processor (112) may be configured to realize the procedures and/or methods proposed in the present invention. The memory (114) is connected to the processor (112) and stores diverse information related to the operations of the processor (112). The RF unit (116) is connected to the processor (112) and transmits and/or receives radio signals. The user equipment (120) includes a processor (122), a memory (124), and an RF unit (126). The processor (122) may be configured to realize the procedures and/or methods proposed in the present invention. The memory (124) is connected to the processor (122) and stores diverse information related to the operations of the processor (122). The RF unit (126) is connected to the processor (122) and transmits and/or receives radio signals.

The embodiments described above correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Claims that do not have any explicit citations within the scope of the claims of the present invention may either be combined to configure another embodiment of the present invention, or new claims may be added during the amendment of the present invention after the filing for the patent application of the present invention.

Occasionally, in this document, particular operations that are described as being performed by the base station may also be performed by its respective upper node. More specifically, in a network consisting of multiple network nodes including the base station, it is apparent that diverse operations that are performed in order to communicate with the terminal may be performed by the base station or b network nodes other than the base station. The term base station may be replaced by other terms, such as fixed station, Node B, eNode B (eNB), access point, and so on. Furthermore, the term terminal may be replaced by terms including UE (User Equipment), MS (Mobile Station), MSS (Mobile Subscriber Station), and so on.

The above-described embodiments of the present invention may be implemented by using a variety of methods, e.g., being realized in the form of hardware, firmware, or software, or in a combination of hardware, firmware, and/or software. In case of implementing the embodiments of the present invention in the form of hardware, the method according to the embodiments of the present invention may be implemented by using at least one of ASICs (application specific integrated circuits), DSPs (digital signal processors), DSPDs (digital signal processing devices), PLDs (programmable logic devices), FPGAs (field programmable gate arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

It will be apparent to anyone skilled in the art that the present invention can be realized in another concrete configuration (or formation) without deviating from the scope and spirit of the characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

INDUSTRIAL APPLICABILITY

The present invention may be used in wireless communication devices, such as user equipments, base stations, and so on.

What is claimed is:

1. A method for a first user equipment to control a transmission power in a wireless communication system supporting a direct communication between the first user equipment and a second user equipment, the method comprising:

receiving, by the first user equipment, a 2-bit power control command from a base station through a physical downlink control channel, wherein, when the first user equipment is configured to perform the direct communication with the second user equipment, the 2-bit power control command indicates a value from among a first set of power control values, the first set of power control values consisting of {−3 dB, −1 dB, 0 dB, 1 dB}, and wherein, when the first user equipment is configured to perform a communication with the base station, the 2-bit power control command indicates a value from among a second set of power control values, the second set of power control values consisting of {−1 dB, 0 dB, 1 dB, 3 dB}; and adjusting, by the first user equipment, a transmission power using the value indicated by the 2-bit power control command, wherein a mapping relationship between a value of the 2-bit power control command and the first and second sets of power control values is defined according to the following table:

| the value of the power control command | the first set of power control values | the second set of power control values |
|---|---|---|
| 0 | −3 dB | −1 dB |
| 1 | −1 dB | 0 dB |
| 2 | 0 dB | 1 dB |
| 3 | 1 dB | 3 dB. |

2. The method of claim 1, wherein the adjusting of the transmission power includes:

adding the value indicated by the 2-bit power control command from among the first set of power control values or the second set of power control values to a preamble power.

3. The method of claim 1, wherein the 2-bit power control command is received through a 2-bit TPC (transmit power control) field of downlink control information.

4. A first user equipment configured to control a transmission power in a wireless communication system supporting a direct communication between the first user equipment and a second user equipment, the first user equipment comprising:
a RF (Radio Frequency) module; and
a processor operably coupled with the RF module,
wherein the processor is configured to:
receive a 2-bit power control command from a base station through a control channel,
wherein, when the first user equipment is configured to perform the direct communication with the second user equipment, the 2-bit power control command indicates a value from among a first set of power control values, the first set of power control values consisting of {−3 dB, −1 dB, 0 dB, 1 dB}, and
wherein, when the first user equipment is configured to perform a communication with the base station, the 2-bit power control command indicates a value from among a second set of power control values, the second set of power control values consisting of {−1 dB, 0 dB, 1 dB, 3 dB}, and
adjust a transmission power using the value indicated by the 2-bit power control command,
wherein a mapping relationship between a value of the 2-bit power control command and the first and second sets of power control values is defined according to the following table:

| the value of the power control command | the first set of power control values | the second set of power control values |
|---|---|---|
| 0 | −3 dB | −1 dB |
| 1 | −1 dB | 0 dB |
| 2 | 0 dB | 1 dB |
| 3 | 1 dB | 3 dB. |

5. The first user equipment of claim 4, wherein the adjusting of the transmission power includes adding the value indicated by the 2-bit power control command from among the first set of power control values or the second set of power control values to a preamble power.

6. The first user equipment of claim 4, wherein the 2-bit power control command is received through a 2-bit TPC (transmit power control) field of downlink control information.

7. A method for a base station to transmit control information in a wireless communication system supporting a direct communication between a first user equipment and a second user equipment, the method comprising:
receiving channel status information from the first user equipment; and
transmitting a 2-bit power control command to the second user equipment through a control channel, the 2-bit power control command being decided based upon the channel status information,
wherein, when the first user equipment and the second user equipment are different from each other, the 2-bit power control command indicates a value from among a first set of power control values, the first set of power control values consisting of {−3 dB, −1 dB, 0 dB, 1 dB},
wherein, when the first user equipment and the second user equipment are the same, the 2-bit power control command indicates a value from among a second set of power control values, the second set of power control values consisting of {−1 dB, 0 dB, 1 dB, 3 dB}, and
wherein a mapping relationship between a value of the 2-bit power control command and the first and second sets of power control values is defined according to the following table:

| the value of the power control command | the first set of power control values | the second set of power control values |
|---|---|---|
| 0 | −3 dB | −1 dB |
| 1 | −1 dB | 0 dB |
| 2 | 0 dB | 1 dB |
| 3 | 1 dB | 3 dB. |

8. The method of claim 7, wherein the channel status information includes at least one of reception power information of a reference signal, SINR (Signal to Interference plus Noise Ratio) information, and MCS (modulation and coding scheme) level information.

9. The method of claim 8, wherein the SINR information includes at least one of difference information between a received SINR level and a target SINR of the first user equipment, a margin value for a minimum SINR level at which an MCS level is normally operated, the MCS level being currently used by the first user equipment, and a margin value for a minimum SINR level allowing a higher MCS level to be operated, the higher MCS level being higher than the MCS level currently used by the first user equipment.

10. The method of claim 8, wherein the MCS level information includes target MCS level information, the target MCS level information being decided by a received SINR level of the first user equipment.

11. A base station configured to transmit control information to a first user equipment in a wireless communication system supporting a direct communication between the first user equipment and a second user equipment, the base station comprising:
a RF (Radio Frequency) module; and
a processor operably coupled with the RF module,
wherein the processor is configured to:
receive channel status information from the first user equipment; and
transmit a 2-bit power control command to the second user equipment through a control channel, the 2-bit power control command being decided based upon the channel status information,
wherein, when the first user equipment and the second user equipment are different from each other, the 2-bit power control command indicates a value from among a first set of power control values, the first set of power control values consisting of {−3 dB, −1 dB, 0 dB, 1 dB},
wherein, when the first user equipment and the second user equipment are the same, the 2-bit power control command indicates a value from among a second set of power control values, the second set of power control values consisting of {−1 dB, 0 dB, 1 dB, 3 dB}, and
wherein a mapping relationship between a value of the 2-bit power control command and the first and second sets of power control values is defined according to the following table:

| the value of the power control command | the first set of power control values | the second set of power control values |
| --- | --- | --- |
| 0 | −3 dB | −1 dB |
| 1 | −1 dB | 0 dB |
| 2 | 0 dB | 1 dB |
| 3 | 1 dB | 3 dB. |

12. The base station of claim 11, wherein the channel status information includes at least one of reception power information of a reference signal, SINR (Signal to Interference plus Noise Ratio) information, and MCS (modulation and coding scheme) level information.

13. The base station of claim 12, wherein the SINR information includes at least one of difference information between a received SINR level and a target SINR of the first user equipment, a margin value for a minimum SINR level at which an MCS level is normally operated, the MCS level being currently used by the first user equipment, and a margin value for a minimum SINR level allowing a higher MCS level to be operated, the higher MCS level being higher than the MCS level currently used by the first user equipment.

14. The base station of claim 12, wherein the MCS level information includes target MCS level information, the target MCS level information being decided by a received SINR level of the first user equipment.

15. The method of claim 7, wherein the 2-bit power control command is transmitted through a 2-bit TPC (transmit power control) field of downlink control information.

16. The base station of claim 11, wherein the 2-bit power control command is transmitted through a 2-bit TPC (transmit power control) field of downlink control information.

* * * * *